(12) United States Patent
Nichols et al.

(10) Patent No.: US 8,875,507 B2
(45) Date of Patent: Nov. 4, 2014

(54) PUMP DISPLACEMENT CONTROL MECHANISM

(75) Inventors: Thomas A. Nichols, Eldon, IA (US); David V. Rotole, Bloomfield, IA (US)

(73) Assignee: Deere & Company, Moline, IL (US)

( * ) Notice: Subject to any disclaimer, the term of this patent is extended or adjusted under 35 U.S.C. 154(b) by 332 days.

(21) Appl. No.: 13/285,234

(22) Filed: Oct. 31, 2011

(65) Prior Publication Data

US 2013/0104535 A1   May 2, 2013

(51) Int. Cl.
*F16D 39/00* (2006.01)
*F04B 49/00* (2006.01)
*F16H 61/437* (2010.01)
*F16H 61/26* (2006.01)

(52) U.S. Cl.
CPC .............. *F16H 61/437* (2013.01); *F16H 61/26* (2013.01)
USPC ............................................ 60/487; 417/216

(58) Field of Classification Search
USPC ..................... 60/487, 486; 417/216
See application file for complete search history.

(56) References Cited

U.S. PATENT DOCUMENTS

| | | | |
|---|---|---|---|
| 3,938,401 A * | 2/1976 | Bauer | 74/471 R |
| 7,051,641 B2 * | 5/2006 | Berg et al. | 92/12.2 |
| 2002/0026793 A1 * | 3/2002 | Ishimaru et al. | 60/487 |
| 2007/0169475 A1 * | 7/2007 | Mochizuki et al. | 60/487 |
| 2010/0111712 A1 * | 5/2010 | Rotole et al. | 417/53 |

* cited by examiner

*Primary Examiner* — Edward Look
*Assistant Examiner* — Daniel Collins

(57) ABSTRACT

A control arm assembly connected with a hydraulic pump allows for the adjustment of pump displacement by turning a threaded adjustment rod clockwise or counter-clockwise to move a half nut connected with a control rod vertically up or down in a slot of an arm to the desired set point. The half nut has a partial thread that engages the thread of the adjustment rod to control the vertical movement. The design allows for the positive repeatable finite adjustment of the half nut with minimal backlash that reduces the difficulty of the setting process in labor and assembly time. Once the desired set point has been met the adjustment rod is clamped tight to the second arm by tightening the nut against the notch to lock up the assembly to prevent any movement.

12 Claims, 4 Drawing Sheets

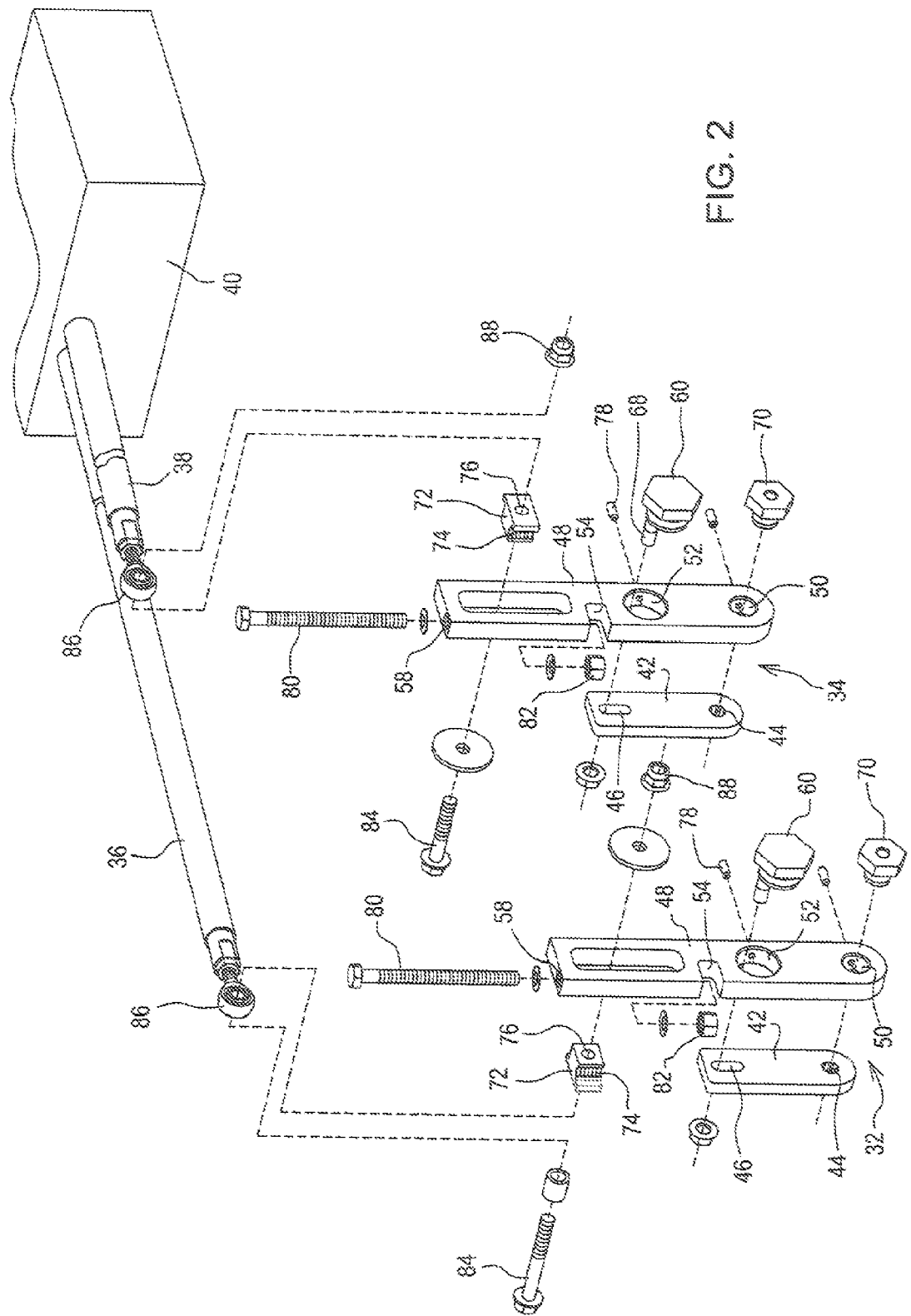

PUMP DISPLACEMENT CONTROL MECHANISM

FIELD OF THE DISCLOSURE

The present disclosure relates to hydraulic drive systems and, more particularly, to control arms for pumps used in such systems.

BACKGROUND OF THE DISCLOSURE

The use of hydrostatic drive systems for agricultural and other work machines is well known. The hydrostatic drive utilizes pressurized hydraulic fluid to variably drive a hydraulic motor with a variable displacement hydrostatic pump. The application of this drive to agricultural vehicles is particularly useful in agricultural machines such as self-propelled windrowers. By having a dual path, hydrostatic drive operating wheels at outboard portions of the windrower, a maximum of maneuverability is achieved at the end of the field being harvested to achieve minimum turning radiuses. While such a dual path drive feature adds to the maneuverability of a hydrostatically driven windrower, the variations in pump output can have an impact on the ability of the windrower to track in a straight line and to accelerate in a uniform fashion. This is caused by manufacturing variations in the output of the individual pumps so that one may have a greater or lesser output than the other under varying field conditions or forward speeds.

It has been known in the past to adjust the inputs of hydrostatic pumps by adjusting the linkage of a control rod connected between an operator steering and forward motion mechanism and the radial arms used to vary the output of the hydrostatic pumps. While such an adjustment may allow the matching of the outputs of the pumps at a given pump output RPM, it does not necessarily do so over the entire operating range of the hydrostatic pumps.

The solution to this problem has been disclosed in US Published Patent Application 20100111712 wherein an adjustable control arm assembly is provided for a hydrostatic pump having a pivotal control input shaft. The assembly includes a first arm connected to the pump control input shaft to provide a pivotal input and a second arm connected to an operator displacement input. A mechanism interconnects the first and second arms to provide a selectively adjustable pivotal relationship between the first and second arms. In the design of US 20100111712 the pump displacement was controlled by adjusting a ball stud connected to the control rods vertically up and down relative to a control arm connected to the pump. However, it has been found that with different pumps having different displacements it is sometimes necessary to provide different lengths of control arms. For example, with a higher displacement pump the control arms need to be shorter in order to rotate the controller of the pump while maintaining the same amount of mechanical input from the steering mechanism and hydro handle than with a lower displacement pump. For manufacturers of vehicles and equipment the need to have different sized control arms for different pump sizes is problematic in that the manufacturer must stock additional parts and mistake proofing is complicated by having different sized control arms.

What is needed therefore is a common pump control arm assembly that does not require mistake proofing and provides enough adjustment for the different displacements of various sizes of drive pumps.

SUMMARY OF THE DISCLOSURE

It is therefore an object of the disclosure is to allow for the positive repeatable finite adjustment the throw of the control arms with minimal backlash.

Another object of the disclosure is to reduce the difficulty of the setting process in labor and assembly time A further object of the disclosure is to provide an adjustment means that does not require mistake proofing and provides enough adjustment for the different displacements of various sizes of drive pumps.

These and other object of the disclosure are accomplished by an adjustable control arm assembly for a hydrostatic pump having a pivotal control input shaft, the assembly comprising: a first arm connected to the pump control input shaft to provide a pivotal input; a second arm having a slot, a notch, and a bore disposed between an end of the second arm and the notch, the bore intersecting the slot, the second arm being adjustably connected to the first arm; a half nut having a threaded half bore, the half nut being disposed in the slot of the second arm, the half nut being connected to an end of a pump control rod; a threaded adjustment rod being disposed within the bore of the second arm and being retained therein by way of a nut disposed in the notch, the threaded adjustment rod threadably engaging the threaded half bore of the half nut; whereby clockwise and counter-clockwise adjustment of the threaded adjustment rod causes the half nut to move up and down respectively relative to the slot thereby varying the throw of the control arm.

Other objects of the disclosure are accomplished by a hydrostatic drive system comprising: a dual path hydrostatic transmission including a pair of pumps respectively coupled for the bidirectional supply of fluid to a pair of hydraulic motors, the pumps having a variable bidirectional output controlled by rotary input shafts for each pump; an operator controlled mechanism to provide a displacement input that varies the output of the pumps in absolute terms and relative to each other to provide speed, direction and turning; a pair of control rods extending from the operator controlled mechanism to adjacent the rotary input shafts for each pump; a first arm connected to the pump control input shaft to provide a pivotal input; a second arm having a slot, a notch and a bore disposed between an end of the second arm and the notch, the bore intersecting the slot, the second arm being adjustably connected to the first arm; a half nut having a threaded half bore, the half nut being disposed in the slot of the second arm, the half nut being connected to an end of a pump control rod; a threaded adjustment rod being disposed within the bore of the second arm and being retained therein by way of a nut disposed in the notch, the threaded adjustment rod threadably engaging the threaded half bore of the half nut; whereby clockwise and counter-clockwise adjustment of the threaded adjustment rod causes the half nut to move up and down respectively relative to the slot thereby varying the throw of the control arm.

In general a control arm assembly connected with a hydraulic pump allows for the adjustment of pump displacement by turning a threaded adjustment rod clockwise or counter-clockwise to move a half nut connected with a control rod vertically up or down in a slot of an arm to the desired set point. The half nut has a partial thread that engages the thread of the adjustment rod to control the vertical movement. The design allows for the positive repeatable finite adjustment of the half nut with minimal backlash that reduces the difficulty of the setting process in labor and assembly time. Once the desired set point has been met the adjustment rod is clamped tight to the second arm by tightening the nut against the notch to lock up the assembly to prevent any movement.

BRIEF DESCRIPTION OF THE DRAWINGS

The exemplary embodiments of the disclosure are described in more detail below with reference to the accompanying drawings wherein:

FIG. 2 is a perspective view of an adjustable linkage for the work machine of FIG. 1;

DETAILED DESCRIPTION OF THE DRAWINGS

Figure 1:
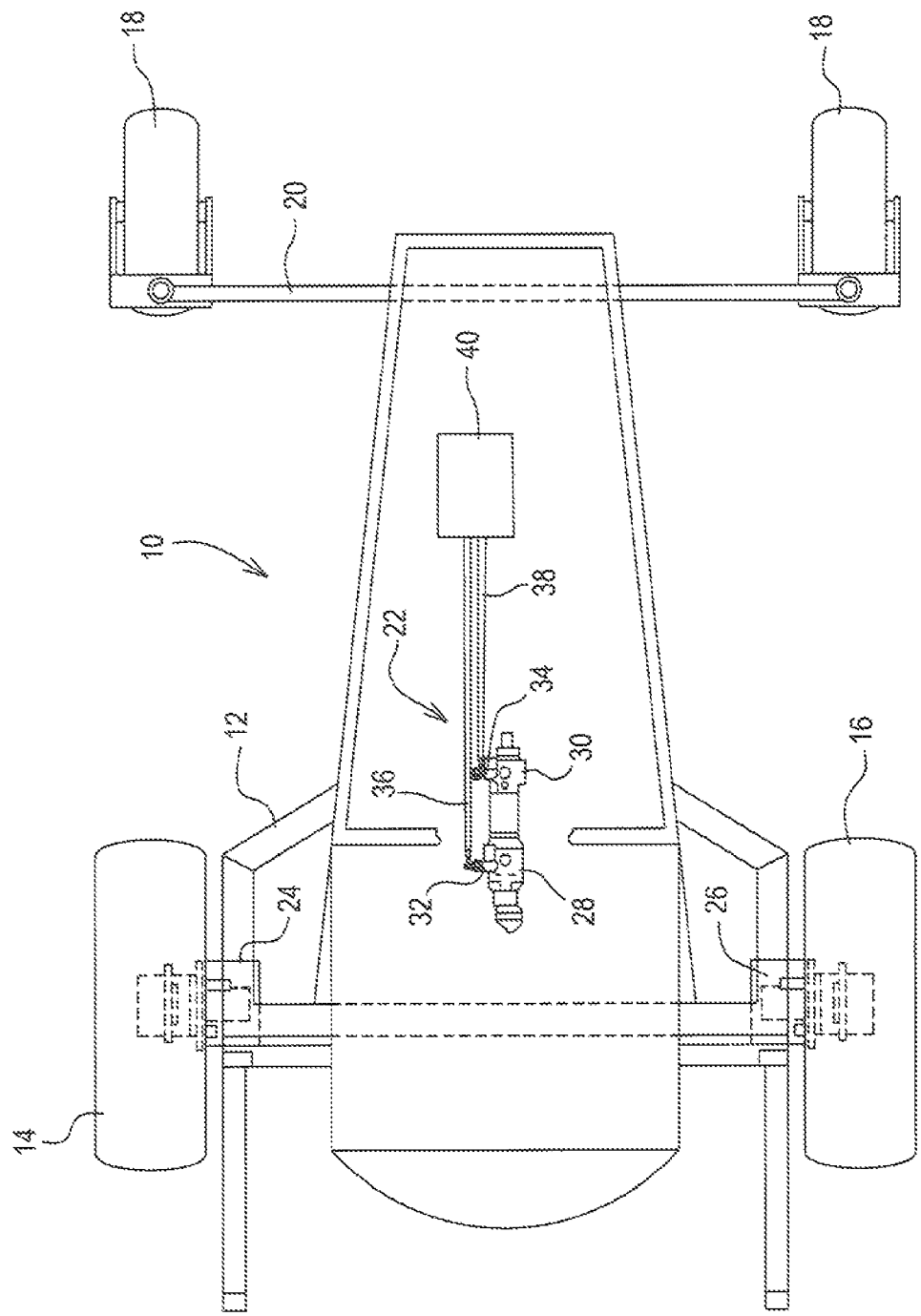
FIG. 1 is a plan view of the work machine with which the present invention is used.

Referring now to FIG. 1, there is shown a self-propelled work machine 10 in the form of a self-propelled windrower having a main frame 12 supported on right and left hand front drive wheels 14 and 16, respectively, and on a pair of rear ground wheels 18, caster mounted to opposite ends of a cross axle 20 that is mounted to the frame 12 for oscillating about a horizontal, fore and aft axis located centrally between the wheels 18. The wheels 14 and 16 are driven by a dual path hydrostatic transmission 22 to right and left hand motors 24 and 26 respectively coupled to the right and left hand drive wheels 14 and 16. Motors 24 and 26 usually have a fixed displacement but may have several selected positions for transport or operating modes. Front and rear, variable displacement, reversible pumps 28 and 30, respectively are fluidly coupled to the motors 24 and 26 by respective pairs of supply and return lines, not shown to enable a better understanding of the present invention. The pumps 28 and 30 provide bidirectional flow to the motors 24 and 26 in varying amounts so that the absolute forward velocity and relative velocity between wheels 14 and 16 may be varied to control forward motion of the work machine 10 and steering. The pumps 28 and 30 each have swash plate control arms 32 and 34 (FIG. 6) respectively that are each mounted for pivotal movement from a zero displacement neutral position with increasing rearward and forward movement, respectively affecting increasing displacement and volume of fluids so as to produce increasing forward and reverse driving speeds of the motors 24 and 26.

The pumps 28 and 30 are driven by an appropriate prime mover, also not shown to enable a better understanding of the invention, that may be in the form of a gasoline or diesel engine or the like providing a rotary torque input to pumps 28 and 30 as well as driving other elements on the work machine 10 such as agricultural processing equipment, not shown. The pumps 28 and 30 have swash plates connected in a known manner to increase or decrease the volume of hydraulic flow so as to affect a variation in RPM of motors 24 and 26. It is to be noted that motors 24 and 26 are typically fixed displacement but may have dual settings for transport and agricultural processing duty cycles. Pumps 28 and 30 have control arms 32 and 34 mounted in a pivotal fashion to set the angle of the swash plate to provide bidirectional flow in a quantity selected to provide absolute forward velocity and steering for the work vehicle 10.

Referring specifically to FIG. 2, control rods 36 and 38 connect to control arms 32 and 34 respectively and extend to an operator control mechanism 40 illustrated schematically. Operator control mechanism 40 provides absolute input in terms of work machine speed and relative output from the pumps 28 and 30 (FIG. 1) to provide velocity of vehicle 10 (FIG. 1) in a forward or rearward direction, as well as steering. Operator control mechanism 40 may take many forms, one of which is shown in U.S. Pat. No. 6,523,635, of common assignment with the present disclosure. The inputs provided by control mechanism 40 provide a displacement input to control rods 36 and 38 to pivot control arm assemblies 32 and 34 to move the vehicle 10 in a forward direction and, rearward direction, and vary the absolute and relative RPM of pumps 28 and 30 to affect steering of vehicle 10.

As is known, the length of the control rods 36 and 38 are typically adjusted in terms of length to provide parallel flow for the pumps 28 and 30 to provide straight direction when an operator is desiring to track and harvest crops in a field. However, the manufacturing variations in pumps frequently necessitate the correction of the steering mechanism.

Figure 4:
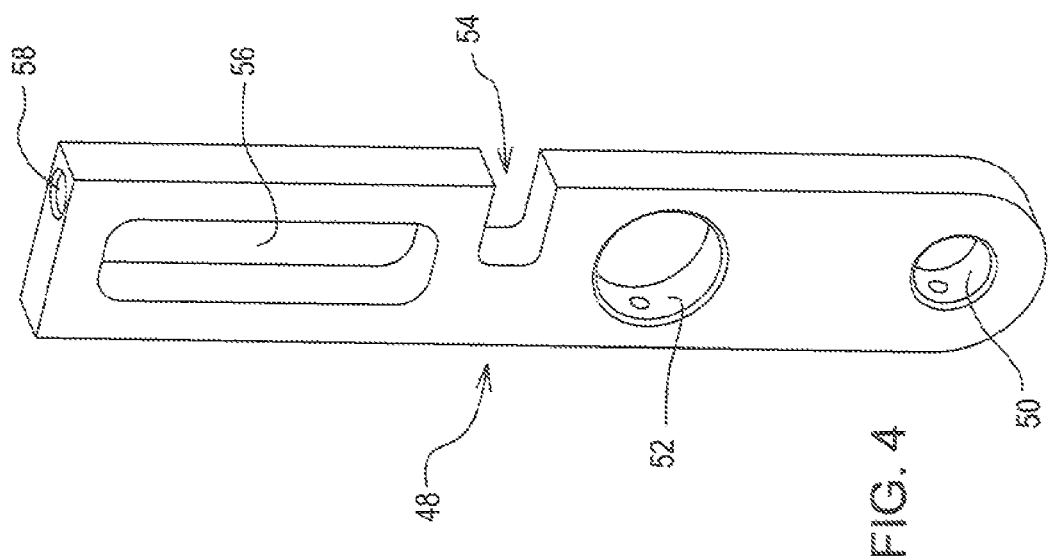
FIG. 4 is another component of the adjustable control arm of FIGS. 1 and 2.
Figure 3:
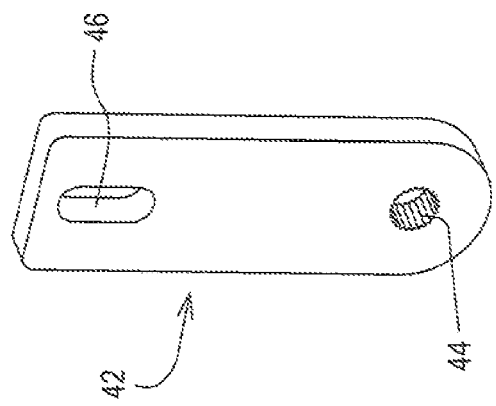
FIG. 3 is a perspective view of one of the components of the adjustable control arm shown in FIGS. 1 and 2.

In accordance with the present disclosure, the control arms 32 and 34 are adjustable as described below. Referring particularly to FIGS. 2-6, it can be seen that the control arms 32 and 34 each are assemblies comprising a first arm 42, shown particularly in FIG. 3. The first arm 42 has a splined bore 44 adapted to engage in a fixed rotary relationship, splines (not shown) on one of the pumps 28 and 30 for the pump input control shaft. The first arm 42 also has an elongated slot 46 at an end spaced from the splined bore 44. As shown particularly in FIG. 4, a second arm 48 has a first bore 50 which is coaxial with the spline bore 44 and a second bore 52 spaced from the axis of the bore 50. The second arm further has a notch 54 disposed in one side thereof. Additionally, the second arm has an elongated slot 56. A bore 58 connects the upper end (as shown in FIG. 4) of the second arm 48 with the notch 54 and also intersects the slot 56.

Figure 5:
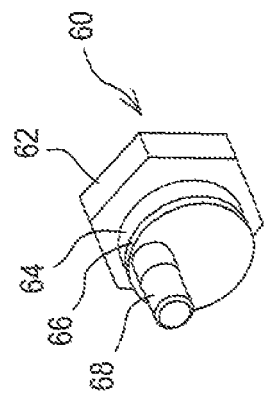
FIG. 5 is a perspective view of another component of the adjustable control arm of FIGS. 1 and 2; and, FIG. 6 is a side view of another embodiment of the adjustable linkage.

As shown particularly in FIG. 5, an eccentric adjustment element 60 is adapted to be received in bore 52. Eccentric adjustment element 60 comprises an appropriate tool engaging head 62, herein shown as a hexagonal head and a pair of annular lands 64 and 66. A pin 68 extends axially from element 60 but is offset from the central axis of annular lands 64 and 66. A second element 70 (FIG. 2) is adapted to be received within bore 50 and has an internal threaded section (not shown) that engages a threaded portion of the pump control input shafts (not shown) for pumps 34 and 36. Element 70 acts as a support for the coaxial pivot between arms 42 and 48 to achieve relative pivotal relationship between the two. A half nut 72 (FIG. 2) is adapted to be received in the slot 56 of arm 48. The half nut 72 has a threaded half bore 74. A bore 76 is also provided in the half nut 72 for reason which will become apparent as the description continues.

As shown in FIG. 2 each control arm 32 and 34 is assembled in a like manner with eccentric 60 extending through bore 52 so that pin 68 is received in radial slot 46 of the first arm 42. Rotation of eccentric 60 causes pin 68 to move first arm 42 in a pivotal relationship relative to second arm 48. A set screw 78 retains the eccentric 60 within bore 52 and also acts as an adjustable element fixing the relative pivotal location of eccentric 60. Element 70 is received in bore 50 of the second arm 48 and engages a threaded portion of the pump control input shafts (not shown) for pumps 34 and 36. The half nut 72 is disposed in the slot 56 of the second arm 48 so that the half bore 74 is disposed adjacent to the bore 58 intersecting the slot 56. A threaded adjustment rod 80 is received in the bore 58 intersecting the slot 56 and threadably engages the threaded half bore 74 of the half nut 72. The adjustment rod 80 is retained in the second arm 48 by way of a nut 82 disposed within the notch 54. It should now be apparent that rotation of the adjustment rod 80 will cause the half nut 72 to move up or down relative to the slot 56 depending upon the direction of rotation. The control rods 36 and 38 are connected to the control arms 32 and 34 respectively by way of fasteners 84 that are disposed through the bore 76 of half nut 72 and the swivel rod ends 86 of the rods 36 and 38. The fasteners 76 are secured by nuts 88.

Figure 6:
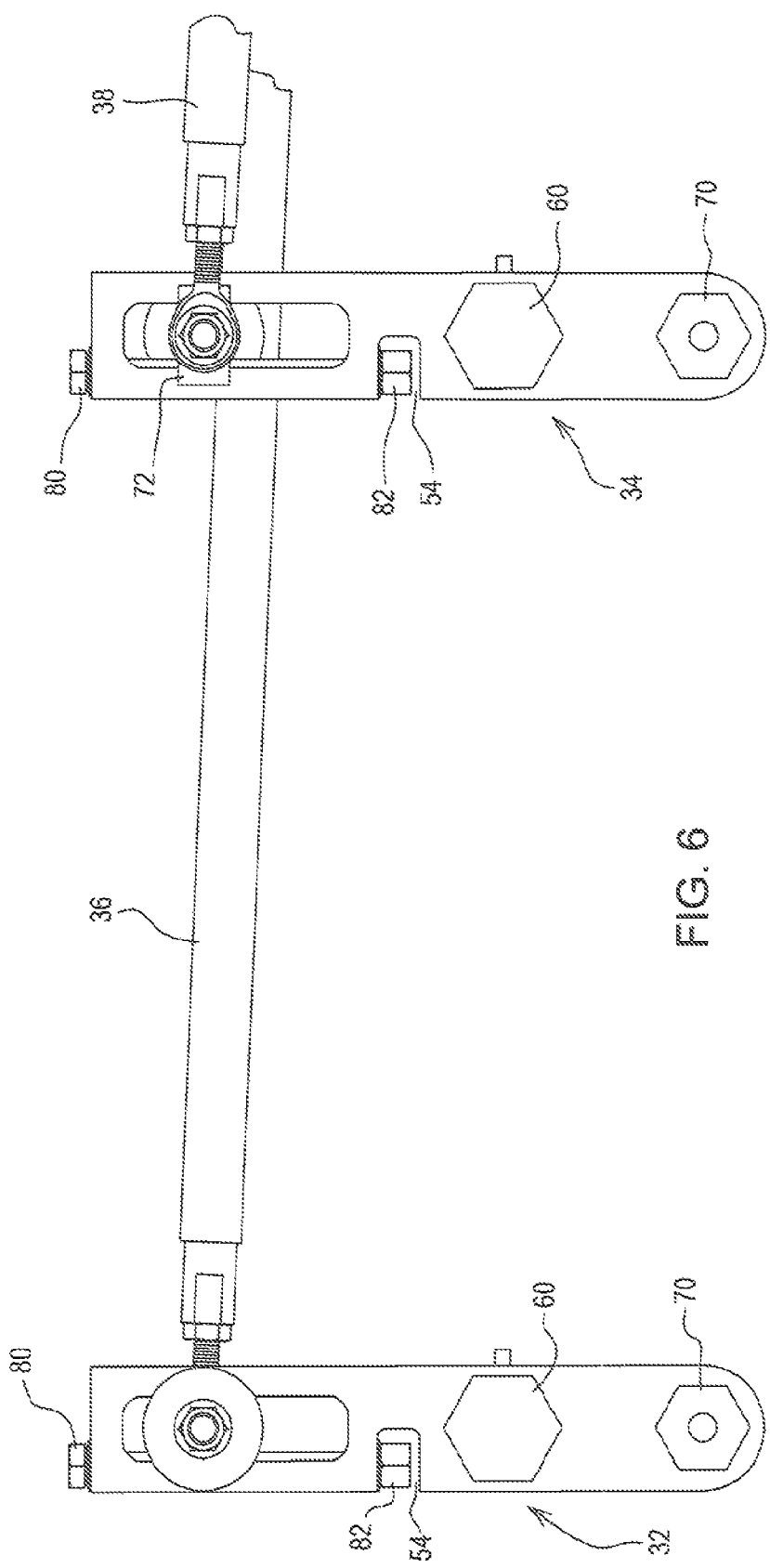

The adjustable control arms 32 and 34 are adjusted as illustrated in FIG. 6. The pumps 28 and 30 are adjusted in the usual fashion to achieve a pump neutral position in which there is neither forward nor reverse RPM applied to the motors 24 and 26. The adjustable control arms 32 and 34 are set relative to one another to achieve an equal RPM at a relatively low output, for example, 500 RPM. This is done by adjusting the eccentric element 60 on one of the arms 32 and 34 to match the output of the two pumps 28 and 30. Once the RPM is equalized at the low level, the control arms 32 and 34 are actuated by the rods 36 and 38 to a maximum pump output, for example, approximately 4000 RPM. At this point, the threaded adjustment rod 80 is adjusted to vary the throw of the control arms 32 and 34 relative to one another. This, in effect, controls the radius of the control arm 32 and 34 relative to the pump control input shafts. Once the desired set point has been met the adjustment rod 80 is clamped tight to the second arm 48 by tightening the nut 82 against the notch 54 to lock up the assembly to prevent any movement. By varying the throw of the control arms 32 and 34 at this maximum RPM, condition, a uniform control of RPM is achieved throughout the output range of the pumps to account for manufacturing variations between the pumps 28 and 30. The net result of such a control is that the work machine 10 tracks in a straight, operator controlled line irrespective of its absolute forward velocity and provides uniform turning in response to operator input.

It should now be apparent that the design allows for the positive repeatable finite adjustment of the half nut to vary the throw of the control arms with minimal backlash that reduces the difficulty of the setting process in labor and assembly time, does not require mistake proofing and provides enough adjustment for the different displacements of various sizes of drive pumps.

Having described the preferred embodiment, it will become apparent that various modifications can be made without departing from the scope of the invention as defined in the accompanying claims.

The invention claimed is:

1. An adjustable control arm assembly for a hydrostatic pump having a pivotal control input shaft, the assembly comprising:
   a first arm connected to the pump control input shaft to provide a pivotal input;
   a second arm having a slot, a notch, and a bore disposed between an end of the second arm and the notch, the bore intersecting the slot, the second arm being adjustably connected to the first arm;
   a half nut having a threaded half bore, the half nut being disposed in the slot of the second arm, the half nut being connected to an end of a pump control rod;
   a threaded adjustment rod being disposed within the bore of the second arm and being retained therein by way of a nut disposed in the notch, the threaded adjustment rod threadably engaging the threaded half bore of the half nut;
   whereby clockwise and counter-clockwise adjustment of the threaded adjustment rod causes the half nut to move up and down respectively relative to the slot thereby varying the throw of the control arm.

2. An adjustable control arm according to claim 1 wherein a pivotal relationship between the first and second arms is coaxial with the pump control input shaft.

3. An adjustable control arm according to claim 2 having an eccentric to move the first arm relative to the second arm about the pivot point.

4. An adjustable control arm according to claim 3 wherein the eccentric element comprises an element journaled in one of the arms and has an eccentric pin received in a slot on the other of the arms.

5. An adjustable control arm according to claim 4 further comprising a set screw for locking the position of the eccentric mechanism.

6. An adjustable control arm according to claim 1 wherein the nut engaging the threaded adjustment rod in the notch is tightened to secure the adjustment of the half nut.

7. A hydrostatic drive system comprising:
   a dual path hydrostatic transmission including a pair of pumps respectively coupled for the bidirectional supply of fluid to a pair of hydraulic motors, the pumps having a variable bidirectional output controlled by rotary input shafts for each pump;
   an operator controlled mechanism to provide a displacement input that varies the output of the pumps in absolute terms and relative to each other to provide speed, direction and turning;
   a pair of control rods extending from the operator controlled mechanism to adjacent the rotary input shafts for each pump;
   a first arm connected to the pump control input shaft to provide a pivotal input;
   a second arm having a slot, a notch and a bore disposed between an end of the second arm and the notch, the bore intersecting the slot, the second arm being adjustably connected to the first arm;
   a half nut having a threaded half bore, the half nut being disposed in the slot of the second arm, the half nut being connected to an end of a pump control rod;
   a threaded adjustment rod being disposed within the bore of the second arm and being retained therein by way of a nut disposed in the notch, the threaded adjustment rod threadably engaging the threaded half bore of the half nut;
   whereby clockwise and counter-clockwise adjustment of the threaded adjustment rod causes the half nut to move up and down respectively relative to the slot thereby varying the throw of the control arm.

8. A hydrostatic drive system according to claim 7 wherein the pivotal axis for the first and second arms is coaxial with the pump input shaft.

9. A hydrostatic drive system according to claim 8 having an eccentric to move the first arm relative to the second arm about the pivot point.

10. A hydrostatic drive system according to claim 9 wherein the eccentric element comprises an element journaled in one of the arms and has an eccentric pin received in a slot on the other of the arms.

11. A hydrostatic drive system according to claim 10 further comprising a set screw for locking the position of the eccentric mechanism.

12. A hydrostatic drive system according to claim 7 wherein the nut engaging the threaded adjustment rod in the notch is tightened to secure the adjustment of the half nut.

* * * * *